United States Patent Office 2,819,168
Patented Jan. 7, 1958

2,819,168

PROTECTION OF FOOD AGAINST PROTEIN DEGRADATION

Eric Mitchell Learmonth, Charlwood Edge, Charlwood, England, assignor to British Soya Products Limited, London, England, a company of Great Britain No Drawing. Application September 8, 1952
Serial No. 308,517

Claims priority, application Great Britain
February 8, 1952

4 Claims. (Cl. 99—91)

This invention relates to processes in which control or inhibition of the action of proteolytic enzymes of the type of papain and cathepsin is desirable, for example processes for the production of bread.

It is well known that enzymes of this type are rendered inactive by the presence of chemical oxidising agents such as iodine trichloride, and that the inhibiting effect of these agents may conveniently be demonstrated by observing the rate of setting of gelatine sols which have been exposed to the action of the enzyme either in the absence or in the presence of the oxidising agent. A gelatine sol incubated at a suitable temperature in the presence of the enzyme alone has the gelatine so much degraded that the sol upon cooling to a lower temperature will gelate only after a long delay, or even not at all. If, however, the oxidising agent is present in the gelatine sol during the incubation period it is found that, upon cooling, the sol will gelate much more rapidly, and sometimes just as rapidly as a similar sol which has not been exposed to the action of the enzyme at all.

Statements have also been published that extracts of active soya beans are capable of inhibiting the proteolytic action of the enzyme trypsin. However, this is not an enzyme of the same class as papain and it appears, moreover, that the inhibiting factor remains active until the soya bean has been autoclaved at a high temperature for a considerable period of time.

We have now found that soya beans and, indeed, other leguminous seeds such as peas, haricot beans and broad beans, which have not been subjected to a heat treatment, such as is commonly required with soya beans in order to remove the bitter flavour preparatory to the inclusion of the bean or its products in food preparations, contain an inhibiting factor (herein referred to for the sake of brevity as the "papain-inhibiting factor") which prevents or largely reduces the proteolytic activity of papain and enzymes of that class.

We have further found that the papain-inhibiting factor is not uniformly distributed throughout the whole soya bean or other leguminous seed, but appears to be concentrated in the germ and in the husk, the latter containing a lower concentration than the germ. With soya beans the cotyledons appear to be free from the papain inhibiting factor and, in some varieties of beans, to contain a factor having the reverse effect, i. e. a "papain-activating" factor. Other leguminous seeds, such as peas, haricot beans and broad beans, exhibit a similar concentration of papain-inhibiting factors in the germ and husks while also sharing a content of papain-activating factors in the cotyledons.

Accordingly, the present invention provides a process of treating protein-containing substances containing an enzyme of the papain class, in which process the uncontrolled proteolytic action of the enzyme is undesirable as, for example, in the production of bread, which is characterised by the step of incorporating the separated germ or husk of raw leguminous seeds, or an extract of the germ or husk, into one or more of the substances employed in the carrying out of the process.

The expression "raw leguminous seeds" is used herein to denote leguminous seeds which have not been processed in such a way, for example by being subjected to a sufficiently high temperature, as to cause destruction of the papain-inhibiting factor. It has been found that this factor is rendered completely ineffective by exposure to a temperature of 100° C. for a short time.

Although the leguminous seeds must not have been processed in any such way referred to above, the germ or husks may, before use, be ground to a flour or extracts prepared from the germs or husks may be concentrated or dried by low temperature evaporation in such a way as not to damage the anti-proteolytic factor contained therein.

Both the germs and the husks, or extracts from both, may, of course, be employed at the same time. It will be appreciated that the germ and/or husk constitutes only a proportion, and generally a relatively small proportion, of the total weight of the seed concerned so that products consisting only of these parts of the seeds have a substantially higher inhibiting activity per unit weight than does the whole seed and may be added in such smaller quantities than would be necessary if the whole of the seed were to be used and this might in any case not be even possible where the papain-activating effect of the cotyledons outweighs the papain-inhibiting effect of the germ or husk.

When, as is frequently the case, the treatment of the protein-containing substance is effected in the presence of an added substance containing an enzyme of the papain class, it is preferred that the germ, husk or extract be admixed with either the protein-containing substance of the added enzyme-containing substance prior to the bringing of these substances into contact with each other.

This preference arises from the fact that the inhibiting effect appears to be much reduced if the enzyme is allowed to act upon the protein, even for a short time, before the leguminous seed product is added. It appears to be necessary, for the best results, for the leguminous seed product to be in contact either with the protein or with the enzyme before the latter comes into contact with the protein. It may be surmised from this that the action of the papain-inhibiting factor is to unite with prosthetic groups in the enzyme or in the protein, thereby preventing these groups from making contact with each other as required by the present theory of the nature of enzymic reactions.

The use of the germ or husk of leguminous seeds, particularly soya beans, or of preparations obtained from these parts of the seeds, in accordance with this invention, has been found to improve the quality of bread made from chemically untreated freshly milled wheat flour in much the same way as the addition of chemical oxidising agents, with the production of better volume, improved crumb, texture and colour and bolder external appearance. This result is thought to be attributable to the presence of the papain-inhibiting factor in the germ, husk or extract but it cannot be stated with certainty that this is the reason. Consequently, we do not wish to be limited by any theory but to state as a feature of this invention the addition of the separated germ or husks (or an extract prepared therefrom) of leguminous seeds to the substances employed in the manufacture of bread and similar fermented goods.

The use of these natural products represents a desirable alternative to the use of chemical oxidising agents such as nitrogen trichloride, potassium bromate, ascorbic acid and so on, some of which have been suspected of causing injury to the health of persons consuming products treated with them.

At present, it cannot be stated what is the factor in the germ or husk of leguminous seeds which is responsible for the inhibiting effect, but it can be mentioned that soya beans which have been heat treated in order to remove the bitter flavour characteristic of the raw beans, have also in general had their active enzymes destroyed. It may be the presence of these enzymes which is responsible for the inhibition of the proteolytic activity of papain and enzymes of that class.

In making bread from chemically untreated wheat flour the raw leguminous seed material may be added to the flour as dry finely powdered soya bean germ advantageously in an amount of from 0.01 to 1.0%, and preferably about 0.2% by weight. The mixture of flour and germ is then made into a dough with the addition of yeast, salt and water, allowed to ferment, is proved, and then baked, all in the ordinary way. Instead of adding the germ or husk material to the flour as a dry powder, it may be suspended in part of the water used to make the dough, or an aqueous extract of the germ or husk may be sprayed onto the flour to be used for making bread. The germ or husk material may be added to the dough after a part of the normal fermentation period has elapsed. Thus it may be added at what is known as the "knock-back" stage, for example mixed with all or part of the salt which is sometimes added to the dough at that stage, in what is termed the "delayed salt method" of bread making.

The following examples are given to illustrate the application of the present invention.

*Example 1.*—A dough is made of 25 oz. chemically untreated freshly milled wheat flour, ½ oz. yeast, ½ oz. salt, 14 oz. water, and 0.7 ml. of an aqueous extract of soya bean germ is added. The extract is prepared by grinding 10 parts of germ in 100 parts by weight of water, centrifuging the mixture and pouring off the supernatant extract from the residue which is discarded.

The dough is then fermented for 1½ hours at 78° F., knocked back, allowed to ferment for a further 1½ hours and then baked. In an actual test a loaf made by this method had a volume (the sum of two diameters at right angles) of 43¼ inches and a loaf made at the same time in exactly the same way from the same ingredients except that the germ extract was omitted, had a volume of only 41¼ inches.

*Example 2.*—Two doughs were made each from the same quantities of salt, yeast and water as in Example 1 but only 24 oz. of flour was used in the making up of the dough and the flour was of a different grist from that used above. At the knock-back stage, i. e. after 1½ hours' fermentation, 1 oz. of flour was worked into one dough and 1 oz. of flour mixed with ¼ oz. of dry finely ground soya bean germ was worked into the other. The amount of germ used was thus 1% of the total weight of flour. The two doughs were fermented and baked as above and the control loaf had a volume of 40¼ inches but the loaf made with the addition of soya bean germ had a volume of 41¾ inches.

Wheat flours of different qualities will require differing quantities of the germ or husk material to produce the best results. There is however no reason to suppose that the advantages obtainable by the use of such material can be obtained only by the use of particular baking methods and the invention should therefore not be understood as limited in any way by the foregoing examples.

It should be noted that the germs or husks (or the flours or extracts produced therefrom, the latter whether concentrated or not) have a very useful application as additions to substances containing factors which will activate enzymes of the papain class, more particularly in those cases where such substances are employed in processes in which proteolytic action of the papain type may occur and is not desired. Such substances may not themselves have any proteolytic activity but their action may be improved by adding to them a papain-inhibiting preparation according to this invention. For example, the use of dried yeast in the preparation of bread has the disadvantage that excessive proteolysis is promoted during the baking of the bread, the dried yeast (though not containing enzymes of the papain class) activating the natural enzymes of the wheat flour. A papain-inhibiting preparation according to this invention may be added to dried yeast in order to counteract this tendency.

One particular example of a process in which the application of this invention is of considerable value is that in which proportions of malt are employed in the production of bread from wheat or other cereal flour.

In such a process it is desired to utilise the diastatic enzymes of the malt in increasing the degradation of the starch present and thus make available more sugars for the panary fermentation. It is frequently found, however, that the proteolytic enzymes also present in the malt bring about an undesirable breakdown of the gluten of the bread which results in an undesirable limitation of the amount of diastatic activity which can be permitted to occur.

If, in accordance with the invention, raw leguminous seed germ or husk, or a flour or an aqueous extract prepared therefrom, be added to the malt preparation prior to its incorporation in the dough, the desired results of the diastatic activity can be achieved without the proteolytic degradation of the gluten of the bread which would otherwise occur.

Furthermore, in the preparation of a malt loaf in which much higher proportions of malt flour or malt extract are added to the wheat flour than would be required in the foregoing example (the object being to produce a loaf in which the maltose and dextrins have been produced in much greater quantity than would be desirable in an ordinary loaf), the proteolytic degradation of the gluten which occurs ordinarily causes the production of a loaf of very small volume. If a suitable quantity of a germ or husk preparation containing the papain-inhibiting factor be incorporated in the malt flour or extract, or in the wheat flour, before the dough is mixed, a loaf of much improved volume is obtained without loss of the sweetness and richness brought about by the high diastasis.

It is a feature of the present invention to provide a malt flour or malt extract, or a mixture thereof with wheat flour, for use in the production of bread, which has incorporated therein a flour or aqueous extract prepared from raw leguminous seed germ or husk and containing the papain-inhibiting factor.

It is also a feature of the invention to provide a wheat flour in which is incorporated a flour or extract of the raw leguminous seed germ or husk.

The invention is also of use in the case of other diastatic preparations than malt, such as fungal and bacterial amylase preparations and the like.

What I claim is:

1. Cereal flour having admixed therewith at least one material selected from the group consisting of a flour produced from the whole of the separated non-cotyledonous parts of raw leguminous seeds and an aqueous extract of the whole of the separated non-cotyledonous parts of raw leguminous seeds.

2. In a process of manufacturing fermented dough from freshly milled cereal flour containing an enzyme of the papain class, controlling the proteolytic activity of the enzyme during the fermentation period by incorporating into the dough a flour produced from separated germs of raw leguminous seeds.

3. In a process of manufacturing fermented dough from freshly milled cereal flour containing an enzyme of the papain class controlling the proteolytic activity of the enzyme during the fermentation period by incorporating into the dough an aqueous extract of separated germs of raw leguminous seeds.

4. In a process of manufacturing fermented dough from freshly milled cereal flour containing an enzyme of the papain class, controlling the proteolytic activity of the enzyme during the fermentation period by incorporating into the dough at least one material selected from the group consisting of a flour produced from the whole of separated non-cotyledonous parts of raw leguminous seeds, and aqueous extract of the whole of the separated non-cotyledonous parts of raw leguminous seeds.

References Cited in the file of this patent

UNITED STATES PATENTS

| | | |
|---|---|---|
| 1,914,478 | Bonotto | June 20, 1933 |
| 2,033,180 | Bunzell | Mar. 10, 1936 |
| 2,035,586 | Bonotto | Mar. 31, 1936 |
| 2,216,174 | Gutherie | Oct. 1, 1940 |
| 2,326,278 | Baker | Aug. 10, 1943 |
| 2,530,056 | Handler | Nov. 14, 1950 |
| 2,670,291 | Melnick | Feb. 23, 1954 |

OTHER REFERENCES

U. S. Department of Agriculture Bulletin Number 701 (September 20, 1918), page 2.

Sumner et al.: Jour. Biol. Chem. 98 (1932), pages 546 and 550–551.